Dec. 5, 1950        L. H. BROWNE        2,532,992
EPICYCLIC DRIVE
Filed July 1, 1944                              3 Sheets-Sheet 1
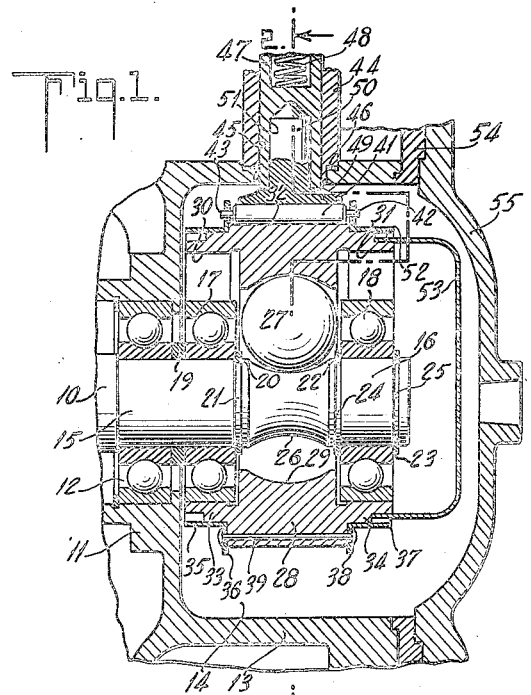
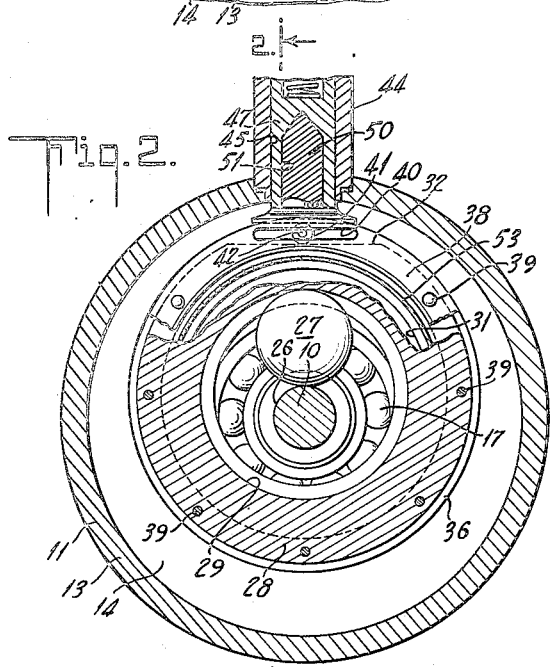
INVENTOR
LINDSAY H. BROWNE
BY
*Van Deventer & Grier*
ATTORNEYS

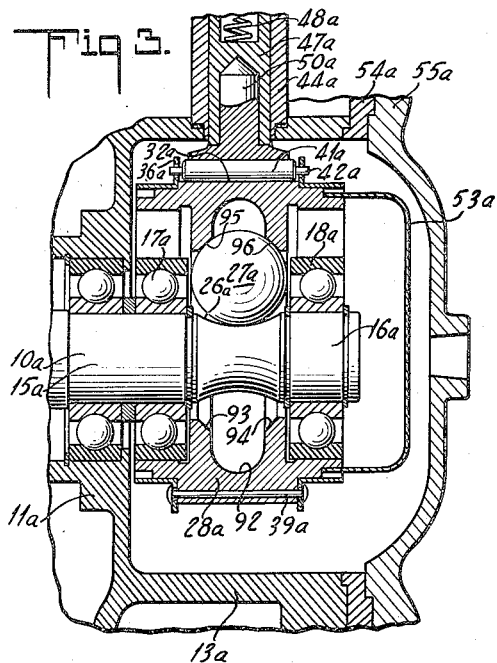

Dec. 5, 1950 L. H. BROWNE 2,532,992
EPICYCLIC DRIVE
Filed July 1, 1944 3 Sheets-Sheet 3

INVENTOR
LINDSAY H. BROWNE
BY Van Deventer + Greer
ATTORNEYS

Patented Dec. 5, 1950

2,532,992

UNITED STATES PATENT OFFICE 2,532,992

EPICYCLIC DRIVE

Lindsay H. Browne, Westport, Conn., assignor to American Brake Shoe Company, a corporation of Delaware Application July 1, 1944, Serial No. 543,120

17 Claims. (Cl. 74—25)

This invention relates to improvements in epicyclic drives and has for an object the provision of apparatus for receiving high speed rotary motion and delivering oscillatory or reciprocating motion at substantially lower speeds.

This application is a continuation, in part, of application Serial No. 503,241, filed September 21, 1943, now Patent No. 2,427,253, issued September 9, 1947.

Another object of the invention is the provision in an epicyclic drive, wherein rolling motion between an inner race and an outer race is effected by a single rolling member, of arrangements in which said rolling member effects contact with one of said races along a single path or line of contact and in which said member effects a plurality of lines of contact with the other race, said lines of contact being equally spaced on each side of the plane of the line of contact in the first race.

A further object of the invention is the provision, in an epicyclic drive, of an inner race and an outer race, and a single rolling member therebetween, said rolling member having a portion of one diameter in contact with one of said races and a portion of a different diameter contacting the other of said races.

Other objects and advantages of the invention will be apparent to those skilled in the art upon a study of this specification and the accompanying drawings.

Referring to the drawings which are given by way of example to illustrate the invention, Fig. 1 is a sectional elevation of an epicyclic drive in which the planes of the lines of contact between the ball are concentric;

Fig. 2 is a sectional elevation taken along the lines 2, 2 of Fig. 1;

Fig. 3 is a sectional elevation of a modification of the arrangement shown in Fig. 1, wherein two paths, or lines of contact, are formed in the outer race, equally spaced on each side of a plane passing through the line of contact between the roller and the inner race;

Fig. 4 is a sectional elevation of an epicyclic drive mounted in a prime mover and including a reciprocable member operated by said drive;

Fig. 5 is a view as seen along the line 5, 5 of Fig. 4, with the end plate of the prime mover removed;

Figure 6:
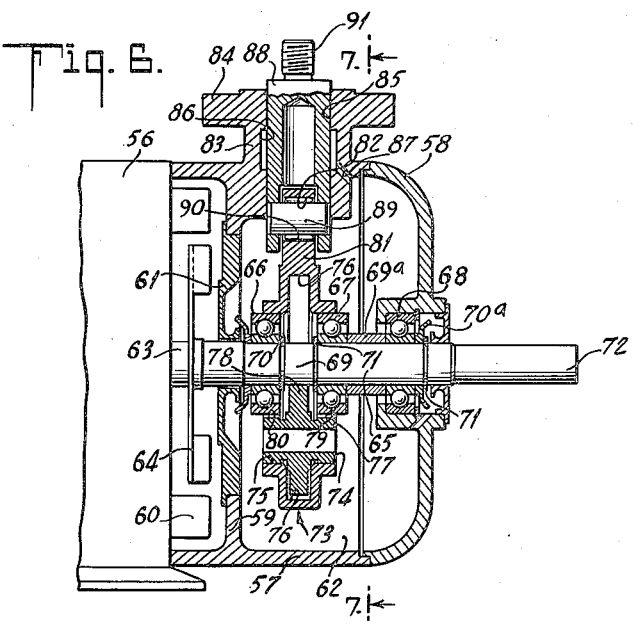
Fig. 6 is a sectional elevation similar to Fig. 4, except that the roller member between the two races is compounded so as to get a greater reduction between the speed of the inner race and the speed of the outer race.

Referring first to Fig. 1, an electric motor has a rotor shaft 10 mounted on suitable bearings, one of which is shown at 12 in the motor housing 11. The housing 11 has an extension 13 which forms part of a chamber 14, which houses the drive.

The shaft 10, has stepped portions 15 and 16 upon which respectively are mounted inner races of ball bearings 17 and 18. A suitable spacer ring 19 is provided between the ball bearing 17 and the ball bearing 12. The ball bearing 17 is secured on the shaft by means of a spring ring 20, mounted in a groove 21. The ball bearing 18 is secured to a portion of the shaft 16 by means of spring rings 22 and 23 mounted respectively in grooves 24 and 25. A race 26 is formed on the shaft between the portions 15 and 16 and this race is in contact with a ball 27.

A hollow member 28 has an inwardly facing race 29 formed therein and this race is maintained in contact with the ball 27 by means of the ball bearings 17 and 18 as their outer races roll around the annular counterbores 30 and 31, respectively.

Although the hollow member 28 is shown in the drawings in one form, it will be understood that it may be of any desired form provided said form includes at least one flat surface 32. The hollow member 28 is provided with a boss portion 33 on one end thereof and a like boss portion 34 on the other end thereof. A ring 35 having a flange 36 is mounted on the boss 33 and a like ring 37 having a flange 38 is mounted on the boss 34. These rings are secured to the hollow member 28 by means of rivets 39 passing through the body of the hollow member and the flanges 36 and 38.

Formed in the flanges 36 and 38, substantially parallel to the flat surface 32, are parallel slots, one of which is shown at 40.

A roller 41 has shanks 42 and 43 formed on the ends thereof and these shanks engage the slots 40.

Mounted on the wall of the extension 13, is a pump cylinder 44. The cylinder may have a counterbored portion 45 and may be mounted in a counterbored hole in the wall 13, with a suitable gasket 46, therebetween. A piston 47 forms a working fit in the cylinder 44 and is urged downwardly as viewed in Fig. 1, by means of a spring 48 the upper end of which contacts the head (not shown), of the cylinder 44. A plate member 49, the bottom portion of which is flat, and contacts the roller 41, has a shank or boss 50 which forms a fit in the counterbored hole 51, in the piston 47. The boss 34, formed on the hollow member 28, is stepped at 52 and a cup 53 forms a tight fit with the step 52 so that the space between the races may be packed with lubricant and the cup 53 serves to retain the lubricant therein. A ring member 54 may be provided for supporting the cylinder 44, and a suitable closure plate 55 encloses the drive in the chamber 14.

Referring now to Fig. 3, the arrangement is similar to Figs. 1 and 2 in all respects except that the points of contact between the ball and the hollow member are different. Therefore, like parts in Fig. 3 will be given the same numerals, with the addition of the letter *a*, as the corresponding ones in Figs. 1 and 2. The inner race 26a, forms a rolling contact with the ball 27a. The hollow member 28a includes a clearance groove 92 and on one side of this clearance groove is an angular face 93 and on the other side of the groove is an angular face 94. These angular surfaces 93, 94 form races which contact the ball 27a, at 95 and 96 respectively. Since the points of contact 95 and 96 are equidistant from a vertical axis passing through the ball 27a, a smooth action is obtained and rolling contact is maintained between the race 26a and the ball 27a and between the ball and the surfaces 95, 96 in the hollow member.

Since the projection of the lines of contact 95 and 96 to a horizontal line passing through the center of the ball 27a are shorter than the radius of the ball (the distance from the center to the point of contact with the race 26a), in Fig. 3, the (movement of the) hollow member 28a will make less gyrations, or complete strokes per minute than the number of gyrations made by the hollow member 28 (Fig. 1), the number of revolutions per minute of the prime mover being the same.

Figure 7:
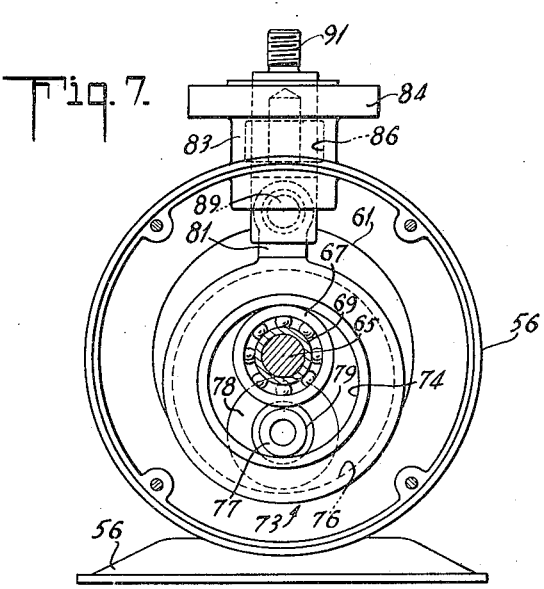
Fig. 7 is an end view as seen along the lines 7, 7 of Fig. 6.

Instead of moving the piston 47, the hollow member may be employed to move any other type of mechanism desired either by bearing on the hollow member, bearing on the roller 41 or by directly connecting the member to be moved to the hollow member. An example of the latter case is shown in Figs. 6 and 7, wherein an electric motor 56, carries an extension 57 on its casing and this extension is closed by the end plate 58. The extension 57 is comprised of a hollow ring with an inwardly facing annular flange 59 between the epicyclic drive and the windings 60, of the motor. The closure plate 61 mounted in the opening in the annular flange isolates the epicyclic drive compartment 62, from the motor windings 60. The motor shaft 63 carries the usual fan 64 and has a stepped portion 65 which carries ball bearings 66, 67 and 68. The portion of the shaft between the bearings 66 and 67, designated by the numeral 69, is provided for contact with a roller member, to be presently described, and this portion may be considered the equivalent of an inner race. On either side of the portion 69 are grooves for accommodating spring-retaining rings 70 and 71. These retaining rings respectively retain the ball bearings 66 and 67 in position on the shaft. The ball bearing 68 is mounted in the end plate 58 and a spacer sleeve 69a, between the ball bearing 67 and ball bearing 68, maintains them in proper space relation on the shaft. An oil slinging washer 70a members up with the ball bearing 68 and is retained in this relation by a spring ring 71, engaging a groove in the shaft 65.

The shaft has an extension 72 to enable a direct drive to be obtained at motor speed.

A hollow member, generally designated by the numeral 73, has aligned bores 74 and 75 with a clearance groove 76 therebetween.

A roller member 77 has a mid portion 78 which effects rolling contact with the shaft race 69, and on each side of the portion 78 this roller member has portions 79 and 80, of equal and reduced diameter, which respectively roll around the surfaces 74 and 75.

Opposite the points of contact, between portions 79 and 80, and the surfaces 74 and 75, the outer races of the ball bearings 67 and 66 respectively, contact said surfaces, thereby the portions 79 and 80 are maintained in rolling contact with the surfaces 74 and 75. Since the portion 78, in rolling contact with the shaft race 69, is of greater diameter than the diameters of the portions 79 and 80, a reduction in speed, equal to the ratio of the radii of the portion 78 and the portions 79 and 80 (in contact with the surfaces 74 and 75), is obtained.

As the roller member 77 is continuously interposed between the shaft race 69 and the portions or races 74, 75, in the hollow member 73, the member 73 moves in an orbital path, therefore, any element to be moved reciprocally, may be caused to contact the hollow member 73 or may be directly connected to it.

The hollow member 73 may have formed integral therewith, a boss 81 with a transverse hole 82 formed therein, parallel to the axis of the shaft 65. A boss 83, preferably formed integral with the extension casing 57, may have a flange 84 formed integral therewith.

A central bore 85 is formed in the boss at right angles to the axis of the shaft 65, and this bore has an undercut portion 86 intermediate the ends thereof. An oil passage 87, formed in the boss 83 communicates with the chamber 62 and with the undercut portion 86, of the bore 85. A tubular member 88 forms a working fit in the bore 85, and has a cross hole formed therein near its lower end to accommodate a wrist pin 89. The wrist pin extends through the hole 82 formed in the boss 81, and may carry a roller or needle bearing 90, therebetween.

The flange 84 may carry suitable holes, not shown, to facilitate the connection of a driven member thereto. The upper end of the tubular member 88 may carry a threaded boss, or stub shaft 91, to which a member to be driven may be connected.

In Figs. 6 and 7 described above, the reduction between the shaft race 69 and the hollow member races 74 and 75, is in two steps. In Figs. 4 and 5 the reduction is in one step and the roller between the shaft race and the hollow member race is somewhat equivalent to the ball 27, shown in Fig. 1, with the exception that the ball makes substantially a point contact with its race whereas with the roller the contact between the roller and the race is substantially a line contact parallel to the axis of the shaft. Numerals applied to elements in Figs. 4 and 5 that are the same as elements shown in Figs. 6 and 7 are given the same numerals as those in Figs. 6 and 7, with the addition of the letter *a*.

A hollow member 73a is provided with a hardened and ground ring insert 97, and the bore 98 of this ring is contacted by the outer races of the ball bearings 66a and 67a. The roller 99 makes contact with the surface 98 in the hollow member and contact with the shaft race 69a. Since the contact between the roller 99 and the surfaces 98 and 69a is a rolling contact, the reduction in speed equals the ratio of the radius of the race 69a with respect to that radius plus the diameter of the roller 99 (the latter of which constitutes the greatest radial distance from the center of the shaft 65 to the surface 98). It is obvious that since one step is employed in this epicyclic drive the reduction in speed is not as great as the reduction in speed in the arrangement shown in Figs. 6 and 7, and since the arrangement shown in Figs. 1, 4 and 5 relate to a single reduction, likewise the arrangements shown in Figs. 3, 6 and 7 show compound reductions, it is obvious that many other arrangements than those shown may be made without departing from the spirit of the invention, as set forth in the appended claims.

What is claimed is:

1. In an epicyclic drive, a hollow housing having a duplex inwardly facing race formed therein termed an outer race, a rotating shaft, an inner race on said shaft, said shaft having its axis at right angles to the plane of said outer race, a single ball between and in rolling contact with both said inner race and said outer race, the line of contact between said ball and said inner race lying on a plane substantially 90° with respect to the axis of said hollow housing, and the lines of contact between the ball and the outer race lying on each side of and substantially parallel to said plane, and means for maintaining said races and said ball in rolling contact.

2. In an epicyclic drive, a hollow member, a shaft having its axis at right angles to the plane of said hollow member, races formed on both said shaft and in said hollow member, a single roller between said races and in contact therewith for transmitting movement from said shaft to said member, the line of contact between one of said races and the roller lying on a plane at right angles to and bisecting said last mentioned race and two lines of contact between said roller and the other race lying on each side of said plane, and means spaced apart from said races and said roller and cooperating with said hollow member for maintaining said races and said roller in rolling contact.

3. In an epicyclic drive, a driven shaft, a housing including at least one bearing supporting said shaft, a reciprocable member positioned in said housing at right angles to said shaft, an outwardly facing inner race formed on said shaft, a hollow member having an inwardly facing outer race formed therein, a single unitary roller means between said races, means on said shaft cooperating with said hollow member for maintaining said roller means in rolling contact with both said races at all times, and means operatively connecting said hollow member to said reciprocable member, whereby said last member is reciprocated at a number of strokes per minute substantially less than the number of revolutions per minute of said shaft.

4. In an epicyclic drive, a driven shaft, a housing including bearing means supporting said shaft, a reciprocable member mounted in said housing with its axis at right angles to the axis of said shaft, an inner race formed on said shaft, a hollow member having an inwardly facing outer race, roller means between said races, means on said shaft and cooperating with surfaces in said hollow member concentric with the outer race therein for maintaining said roller means in rolling contact with both said races at all times, and means operatively connecting said hollow member to said reciprocable member, said last means including a wrist pin and a wrist pin bearing, whereby said reciprocable member may make one complete stroke each time said roller means completely traverses said inwardly facing race.

5. In combination, a casing having a stator or field winding mounted therein, a rotor in said casing, carrying said rotor shaft, bearings in said casing supporting said shaft, a reciprocable member mounted in said casing at right angles to said shaft, an inner race formed on said shaft, a hollow member within said casing having an inwardly facing race, roller means between said races, means carried on said shaft and cooperating with said hollow member for maintaining said roller means in rolling contact with both said races at all times, a connecting rod projecting from said hollow member and having a wrist pin bearing on its outer end, and a wrist pin pivotally connecting said connecting rod to said reciprocable member, whereby the latter may make one complete stroke each time said roller means completely traverses said second mentioned race.

6. In combination, a casing having a stator or field winding mounted therein, a rotor in said casing, a shaft carrying said rotor, bearings in said casing supporting said shaft, a reciprocable member mounted in said casing radially with respect to said shaft, an inner race formed on said shaft, a hollow member within said casing having an interior bore, a sleeve inserted in said bore having its interior surface forming an inwardly facing race, roller means between said races, means carried on said shaft and cooperating with said sleeve for maintaining said roller means in rolling contact with both said races at all times, a connecting rod projecting from said hollow member and carrying a wrist pin bearing on its outer end, and a wrist pin engaging said wrist pin bearing and pivotally connecting said connecting rod to said reciprocable member, whereby the latter may make one complete stroke each time said roller means completely traverses said second mentioned race.

7. In an epicyclic drive, a hollow housing having an inwardly facing race formed therein, said race being divided into two spaced race surfaces with a clearance groove therebetween, a shaft having its axis at right angles to a plane bisecting said clearance groove, an outwardly facing race formed on said shaft, roller means between said races, having a large periphery engaging said inner race and small peripheries engaging said outer race, thereby effecting a compound speed reduction between said races.

8. In combination, a casing having a stator or field winding mounted therein, a shaft journaled in said casing, a rotor in said casing supported on said shaft, a reciprocable member mounted in said casing radial with respect to said shaft, an inner race formed on said shaft, a hollow member within said casing having; a pair of spaced, inwardly facing races therein with a clearance groove therebetween; a compound roller member between said races and having one periphery engaging said inner race and two smaller peripheries engaging said spaced races, means carried on said shaft and cooperating with said hollow member for maintaining said roller in rolling contact with said races at all times, a connecting rod projecting from said hollow member and a wrist pin bearing on its outer end, and a wrist pin engaging said last bearing and pivotally connecting said connecting rod to said reciprocable member, whereby the latter makes one complete stroke each time said roller completely traverses said second mentioned race.

9. In an epicyclic drive, a rotating shaft, a hollow housing having an inwardly facing race formed therein and termed an outer race, an inner race carried on said shaft, said shaft having its axis at right angles to a plane passing through the outer race, a single rolling member between said races effecting contact with one of said races along a single path or line of contact and effecting a plurality of lines of contact with the other of said races, said last lines of contact being equally spaced on each side of the plane of said first line of contact, and means associated with said outer race and reciprocated thereby.

10. In an epicyclic drive, a rotating shaft, a hollow housing having an inwardly facing race formed therein and termed an outer race, an inner race carried on said shaft, said shaft having its axis at right angles to a plane passing through the outer race, a single rolling member between said races effecting contact with one of said races along a single path or line of contact and effecting a plurality of lines of contact with the other of said races, said last lines of contact being parallel and spaced apart from each other, a member lying in the plane of and operatively connected to said hollow housing and adapted to be reciprocated thereby, and roller bearing means between said member and the means operatively connecting it to said hollow housing.

11. In an epicyclic drive, a hollow member, a shaft having its axis at right angles to the plane of said hollow member, races formed on said shaft and in said hollow member, a single rolling member between said races, said rolling member having a portion of one diameter in contact with one of said races and a portion of a different diameter contacting the other of said races, means for maintaining said races and said rolling member in rolling contact, and means moved by said hollow member.

12. In a mechanical movement, a drive member, a driven member, a single roller therebetween, a pair of spaced races in one of said members in rolling contact with said roller, and a single race in the other of said members also in rolling contact with said roller, said last race lying on a plane between and substantially parallel to planes extending through said first races and means for maintaining said races and said roller in rolling contact.

13. Means for converting rotary to reciprocal motion including, a hollow member adapted to be reciprocated, a shaft comprising a driven member and having its axis at right angles to a median plane passing through said hollow member, races formed on said shaft and in said hollow member, a single rolling member in rolling contact with said races, said rolling member having a portion of one diameter in contact with one of said races and a portion of different diameter contacting the other of said races, and means for maintaining said races and said rolling member in rolling contact, thereby causing said hollow member to reciprocate at a rate lower than the speed at which said shaft is driven.

14. In apparatus for converting rotary to reciprocatory motion, a shaft forming a driving member, said shaft having an outwardly facing race, a driven member having an inwardly facing race, a single roller element engaging said races for receiving rotation from said outwardly facing race and imparting motion to said inwardly facing race, means on said shaft and cooperating with said driven member for maintaining said roller element in continuous engagement with both said races during rotation of said shaft, a reciprocatory element adjacent said driven member, and means interposed between said driven member and said reciprocatory element for imparting motion thereto.

15. In apparatus for converting rotary to reciprocatory motion, a shaft forming a driving member, said shaft having an outwardly facing race, a driven member having an inwardly facing race, a single roller element engaging said races for receiving rotation from said outwardly facing race and imparting motion to said inwardly facing race, means on said shaft and cooperating with said driven member for maintaining said roller element in continuous engagement with both said races during rotation of said shaft, a reciprocatory element adjacent said driven member, and wrist pin connecting means interposed between said driven member and said reciprocatory element for imparting motion thereto.

16. In apparatus for converting rotary to reciprocatory motion, a shaft forming a driving member, said shaft having an outwardly facing race, a driven member having an inwardly facing race, one of said races having spaced portions on opposite sides of a plane extending through the other of said races, a single roller element engaging said races for receiving rotation from said outwardly facing race and imparting motion to said inwardly facing race, and means interposed between said shaft and said driven member and spaced from said races for maintaining said roller element in continuous engagement with both said races during rotation of said shaft.

17. In apparatus for converting rotary to reciprocatory motion, a shaft forming a driving member, said shaft having an outwardly facing race, a driven member having an inwardly facing race, a single roller element in rolling contact with said races for receiving rotation from said outwardly facing race and imparting motion to said inwardly facing race, said roller element having a portion of one diameter in contact with one of said races and a portion of different diameter in contact with the other of said races, and means interposed between said shaft and said driven member for maintaining said roller element in continuous engagement with both said races during rotation of said shaft.

LINDSAY H. BROWNE.

REFERENCES CITED

The following references are of record in the file of this patent:

UNITED STATES PATENTS

| Number | Name | Date |
|---|---|---|
| 605,845 | Belanger | June 21, 1898 |
| 689,003 | Hult et al. | Dec. 17, 1901 |
| 747,016 | Sundh et al. | Dec. 15, 1903 |
| 1,568,290 | Morison | Jan. 5, 1926 |
| 1,575,252 | Carter | Mar. 2, 1926 |
| 1,627,775 | Kallet | May 10, 1927 |
| 1,634,507 | Morison | July 5, 1927 |
| 1,706,180 | Morison | Mar. 19, 1929 |
| 1,735,616 | Morison | Nov. 12, 1929 |
| 1,840,314 | Gerard | Jan. 12, 1932 |
| 1,867,981 | Mudd | July 19, 1932 |
| 2,192,084 | Kamenarovic | Feb. 27, 1940 |

FOREIGN PATENTS

| Number | Country | Date |
|---|---|---|
| 191,977 | Switzerland | Sept. 16, 1937 |
| 207,035 | Great Britain | Nov. 22, 1923 |
| 229,919 | Switzerland | Feb. 16, 1944 |